(12) United States Patent
Master

(10) Patent No.: US 7,660,984 B1
(45) Date of Patent: Feb. 9, 2010

(54) METHOD AND SYSTEM FOR ACHIEVING INDIVIDUALIZED PROTECTED SPACE IN AN OPERATING SYSTEM

(75) Inventor: Paul L. Master, Sunnyvale, CA (US)

(73) Assignee: Quicksilver Technology, San Jose, CA (US)

( * ) Notice: Subject to any disclaimer, the term of this patent is extended or adjusted under 35 U.S.C. 154(b) by 830 days.

(21) Appl. No.: 10/437,855

(22) Filed: May 13, 2003

(51) Int. Cl.
*H04L 9/00* (2006.01)
(52) U.S. Cl. ...................................................... 713/164
(58) Field of Classification Search .................. 712/15; 726/4, 17, 22; 713/164
See application file for complete search history.

(56) References Cited

U.S. PATENT DOCUMENTS

| | | | |
|---|---|---|---|
| 3,409,175 A | 11/1968 | Byrne | |
| 3,666,143 A | 5/1972 | Weston | |
| 3,938,639 A | 2/1976 | Birrell | |
| 3,949,903 A | 4/1976 | Benasutti et al. | |
| 3,960,298 A | 6/1976 | Birrell | |
| 3,967,062 A | 6/1976 | Dobias | |
| 3,991,911 A | 11/1976 | Shannon et al. | |
| 3,995,441 A | 12/1976 | McMillin | |
| 4,076,145 A | 2/1978 | Zygiel | |
| 4,143,793 A | 3/1979 | McMillin et al. | |
| 4,172,669 A | 10/1979 | Edelbach | |
| 4,174,872 A | 11/1979 | Fessler | |
| 4,181,242 A | 1/1980 | Zygiel et al. | |
| RE30,301 E | 6/1980 | Zygiel | |
| 4,218,014 A | 8/1980 | Tracy | |
| 4,222,972 A | 9/1980 | Caldwell | |
| 4,237,536 A | 12/1980 | Enelow et al. | |
| 4,252,253 A | 2/1981 | Shannon | |
| 4,302,775 A | 11/1981 | Widergren et al. | |
| 4,333,587 A | 6/1982 | Fessler et al. | |
| 4,354,613 A | 10/1982 | Desai et al. | |
| 4,377,246 A | 3/1983 | McMillin et al. | |
| 4,380,046 A | 4/1983 | Fung et al. | |
| 4,393,468 A | 7/1983 | New | |
| 4,413,752 A | 11/1983 | McMillin et al. | |
| 4,458,584 A | 7/1984 | Annese et al. | |
| 4,466,342 A | 8/1984 | Basile et al. | |
| 4,475,448 A | 10/1984 | Shoaf et al. | |
| 4,509,690 A | 4/1985 | Austin et al. | |
| 4,520,950 A | 6/1985 | Jeans | |
| 4,549,675 A | 10/1985 | Austin | |
| 4,553,573 A | 11/1985 | McGarrah | |
| 4,560,089 A | 12/1985 | McMillin et al. | |
| 4,577,782 A | 3/1986 | Fessler | |
| 4,578,799 A | 3/1986 | Scholl et al. | |
| RE32,179 E | 6/1986 | Sedam et al. | |

(Continued)

FOREIGN PATENT DOCUMENTS

DE 100 18 374 A1 10/2001

(Continued)

OTHER PUBLICATIONS

A Hardware Testbed for Distributed Heterogeneous Adaptive Computing, Christopher Bachmann, 1999.*

(Continued)

*Primary Examiner*—Andrew L Nalven
(74) *Attorney, Agent, or Firm*—Marc S. Kaufman; Nixon Peabody, LLP

(57) ABSTRACT

Aspects for achieving individualized protected space in an operating system are provided. The aspects include performing on demand hardware instantiation via an ACE (an adaptive computing engine), and utilizing the hardware for monitoring predetermined software programming to protect an operating system.

26 Claims, 3 Drawing Sheets

U.S. PATENT DOCUMENTS

| | | |
|---|---|---|
| 4,633,386 A | 12/1986 | Terepin et al. |
| 4,649,512 A | 3/1987 | Nukiyama |
| 4,658,988 A | 4/1987 | Hassell |
| 4,694,416 A | 9/1987 | Wheeler et al. |
| 4,711,374 A | 12/1987 | Gaunt et al. |
| 4,713,755 A | 12/1987 | Worley, Jr. et al. |
| 4,719,056 A | 1/1988 | Scott |
| 4,726,494 A | 2/1988 | Scott |
| 4,747,516 A | 5/1988 | Baker |
| 4,748,585 A | 5/1988 | Chiarulli et al. |
| 4,758,985 A | 7/1988 | Carter |
| 4,760,525 A | 7/1988 | Webb |
| 4,760,544 A | 7/1988 | Lamb |
| 4,765,513 A | 8/1988 | McMillin et al. |
| 4,766,548 A | 8/1988 | Cedrone et al. |
| 4,781,309 A | 11/1988 | Vogel |
| 4,800,492 A | 1/1989 | Johnson et al. |
| 4,811,214 A | 3/1989 | Nosenchuck et al. |
| 4,824,075 A | 4/1989 | Holzboog |
| 4,827,426 A | 5/1989 | Patton et al. |
| 4,850,269 A | 7/1989 | Hancock et al. |
| 4,856,684 A | 8/1989 | Gerstung |
| 4,870,302 A | 9/1989 | Freeman |
| 4,901,887 A | 2/1990 | Burton |
| 4,905,231 A | 2/1990 | Leung et al. |
| 4,921,315 A | 5/1990 | Metcalfe et al. |
| 4,930,666 A | 6/1990 | Rudick |
| 4,932,564 A | 6/1990 | Austin et al. |
| 4,936,488 A | 6/1990 | Austin |
| 4,937,019 A | 6/1990 | Scott |
| 4,960,261 A | 10/1990 | Scott et al. |
| 4,961,533 A | 10/1990 | Teller et al. |
| 4,967,340 A | 10/1990 | Dawes |
| 4,974,643 A | 12/1990 | Bennett et al. |
| 4,982,876 A | 1/1991 | Scott |
| 4,993,604 A | 2/1991 | Gaunt et al. |
| 5,007,560 A | 4/1991 | Sassak |
| 5,021,947 A | 6/1991 | Campbell et al. |
| 5,040,106 A | 8/1991 | Maag |
| 5,044,171 A | 9/1991 | Farkas |
| 5,090,015 A | 2/1992 | Dabbish et al. |
| 5,099,418 A | 3/1992 | Pian et al. |
| 5,129,549 A | 7/1992 | Austin |
| 5,139,708 A | 8/1992 | Scott |
| 5,144,166 A | 9/1992 | Camarota et al. |
| 5,156,301 A | 10/1992 | Hassell et al. |
| 5,156,871 A | 10/1992 | Goulet et al. |
| 5,165,023 A | 11/1992 | Gifford |
| 5,165,575 A | 11/1992 | Scott |
| 5,190,083 A | 3/1993 | Gupta et al. |
| 5,190,189 A | 3/1993 | Zimmer et al. |
| 5,193,151 A | 3/1993 | Jain |
| 5,193,718 A | 3/1993 | Hassell et al. |
| 5,202,993 A | 4/1993 | Tarsy et al. |
| 5,203,474 A | 4/1993 | Haynes |
| 5,218,240 A | 6/1993 | Camarota et al. |
| 5,240,144 A | 8/1993 | Feldman |
| 5,245,227 A | 9/1993 | Furtek et al. |
| 5,261,099 A | 11/1993 | Bigo et al. |
| 5,263,509 A | 11/1993 | Cherry et al. |
| 5,269,442 A | 12/1993 | Vogel |
| 5,280,711 A | 1/1994 | Motta et al. |
| 5,297,400 A | 3/1994 | Benton et al. |
| 5,301,100 A | 4/1994 | Wagner |
| 5,303,846 A | 4/1994 | Shannon |
| 5,335,276 A | 8/1994 | Thompson et al. |
| 5,336,950 A | 8/1994 | Popli et al. |
| 5,339,428 A | 8/1994 | Burmeister et al. |
| 5,343,716 A | 9/1994 | Swanson et al. |
| 5,361,362 A | 11/1994 | Benkeser et al. |
| 5,368,198 A | 11/1994 | Goulet |
| 5,379,343 A | 1/1995 | Grube et al. |
| 5,381,546 A | 1/1995 | Servi et al. |
| 5,381,550 A | 1/1995 | Jourdenais et al. |
| 5,388,062 A | 2/1995 | Knutson |
| 5,388,212 A | 2/1995 | Grube et al. |
| 5,392,960 A | 2/1995 | Kendt et al. |
| 5,428,754 A | 6/1995 | Baldwin |
| 5,437,395 A | 8/1995 | Bull et al. |
| 5,450,557 A | 9/1995 | Kopp et al. |
| 5,454,406 A | 10/1995 | Rejret et al. |
| 5,465,368 A | 11/1995 | Davidson et al. |
| 5,475,856 A | 12/1995 | Kogge |
| 5,479,055 A | 12/1995 | Eccles |
| 5,490,165 A | 2/1996 | Blakeney, II et al. |
| 5,491,823 A | 2/1996 | Ruttenberg |
| 5,507,009 A | 4/1996 | Grube et al. |
| 5,515,519 A | 5/1996 | Yoshioka et al. |
| 5,517,600 A | 5/1996 | Shimokawa |
| 5,519,694 A | 5/1996 | Brewer et al. |
| 5,522,070 A | 5/1996 | Sumimoto |
| 5,530,964 A | 6/1996 | Alpert et al. |
| 5,534,796 A | 7/1996 | Edwards |
| 5,542,265 A | 8/1996 | Rutland |
| 5,553,755 A | 9/1996 | Bonewald et al. |
| 5,555,417 A | 9/1996 | Odnert et al. |
| 5,560,028 A | 9/1996 | Sachs et al. |
| 5,560,038 A | 9/1996 | Haddock |
| 5,570,587 A | 11/1996 | Kim |
| 5,572,572 A | 11/1996 | Kawan et al. |
| 5,590,353 A | 12/1996 | Sakakibara et al. |
| 5,594,657 A | 1/1997 | Cantone et al. |
| 5,600,810 A | 2/1997 | Ohkami |
| 5,600,844 A | 2/1997 | Shaw et al. |
| 5,602,833 A | 2/1997 | Zehavi |
| 5,603,043 A | 2/1997 | Taylor et al. |
| 5,607,083 A | 3/1997 | Vogel et al. |
| 5,608,643 A | 3/1997 | Wichter et al. |
| 5,611,867 A | 3/1997 | Cooper et al. |
| 5,623,545 A | 4/1997 | Childs et al. |
| 5,625,669 A | 4/1997 | McGregor et al. |
| 5,626,407 A | 5/1997 | Westcott |
| 5,630,206 A | 5/1997 | Urban et al. |
| 5,635,940 A | 6/1997 | Hickman et al. |
| 5,646,544 A | 7/1997 | Iadanza |
| 5,646,545 A | 7/1997 | Trimberger et al. |
| 5,647,512 A | 7/1997 | Assis Mascarenhas deOliveira et al. |
| 5,667,110 A | 9/1997 | McCann et al. |
| 5,684,793 A | 11/1997 | Kiema et al. |
| 5,684,980 A | 11/1997 | Casselman |
| 5,687,236 A | 11/1997 | Moskowitz et al. |
| 5,694,613 A | 12/1997 | Suzuki |
| 5,694,794 A | 12/1997 | Jerg et al. |
| 5,699,328 A | 12/1997 | Ishizaki et al. |
| 5,701,398 A | 12/1997 | Glier et al. |
| 5,701,482 A | 12/1997 | Harrison et al. |
| 5,704,053 A | 12/1997 | Santhanam |
| 5,706,191 A | 1/1998 | Bassett et al. |
| 5,706,976 A | 1/1998 | Purkey |
| 5,712,996 A | 1/1998 | Schepers |
| 5,720,002 A | 2/1998 | Wang |
| 5,721,693 A | 2/1998 | Song |
| 5,721,854 A | 2/1998 | Ebicioglu et al. |
| 5,729,754 A | 3/1998 | Estes |
| 5,732,563 A | 3/1998 | Bethuy et al. |
| 5,734,808 A | 3/1998 | Takeda |
| 5,737,631 A | 4/1998 | Trimberger |
| 5,742,180 A | 4/1998 | DeHon et al. |
| 5,742,821 A | 4/1998 | Prasanna |
| 5,745,366 A | 4/1998 | Highma et al. |
| RE35,780 E | 5/1998 | Hassell et al. |
| 5,751,295 A | 5/1998 | Becklund et al. |
| 5,754,227 A | 5/1998 | Fukuoka |

| Patent No. | Date | Name |
|---|---|---|
| 5,758,261 A | 5/1998 | Weideman |
| 5,768,561 A | 6/1998 | Wise |
| 5,771,362 A | 6/1998 | Bartkowiak et al. |
| 5,778,439 A | 7/1998 | Trimberger et al. |
| 5,784,636 A | 7/1998 | Rupp |
| 5,784,699 A | 7/1998 | McMahon et al. |
| 5,787,237 A | 7/1998 | Reilly |
| 5,790,817 A | 8/1998 | Asghar et al. |
| 5,791,517 A | 8/1998 | Avital |
| 5,791,523 A | 8/1998 | Oh |
| 5,794,062 A | 8/1998 | Baxter |
| 5,794,067 A | 8/1998 | Kadowaki |
| 5,802,055 A | 9/1998 | Krein et al. |
| 5,802,278 A | 9/1998 | Isfeld et al. |
| 5,818,603 A | 10/1998 | Motoyama |
| 5,822,308 A | 10/1998 | Weigand et al. |
| 5,822,313 A | 10/1998 | Malek et al. |
| 5,822,360 A | 10/1998 | Lee et al. |
| 5,828,858 A | 10/1998 | Athanas et al. |
| 5,829,085 A | 11/1998 | Jerg et al. |
| 5,835,753 A | 11/1998 | Witt |
| 5,838,165 A | 11/1998 | Chatter |
| 5,838,894 A | 11/1998 | Horst |
| 5,845,815 A | 12/1998 | Vogel |
| 5,860,021 A | 1/1999 | Klingman |
| 5,862,961 A | 1/1999 | Motta et al. |
| 5,870,427 A | 2/1999 | Teidemann, Jr. et al. |
| 5,873,045 A | 2/1999 | Lee et al. |
| 5,881,106 A | 3/1999 | Cartier |
| 5,884,284 A | 3/1999 | Peters et al. |
| 5,886,537 A | 3/1999 | Macias et al. |
| 5,887,174 A | 3/1999 | Simons et al. |
| 5,889,816 A | 3/1999 | Agrawal et al. |
| 5,890,014 A | 3/1999 | Long |
| 5,892,900 A | 4/1999 | Ginter et al. |
| 5,892,961 A | 4/1999 | Trimberger |
| 5,892,962 A | 4/1999 | Cloutier |
| 5,894,473 A | 4/1999 | Dent |
| 5,901,884 A | 5/1999 | Goulet et al. |
| 5,903,886 A | 5/1999 | Heimlich et al. |
| 5,907,285 A | 5/1999 | Toms et al. |
| 5,907,580 A | 5/1999 | Cummings |
| 5,910,733 A | 6/1999 | Bertolet et al. |
| 5,912,572 A | 6/1999 | Graf, III |
| 5,913,172 A | 6/1999 | McCabe et al. |
| 5,917,852 A | 6/1999 | Butterfield et al. |
| 5,920,801 A | 7/1999 | Thomas et al. |
| 5,931,918 A | 8/1999 | Row et al. |
| 5,933,642 A | 8/1999 | Greenbaum et al. |
| 5,940,438 A | 8/1999 | Poon et al. |
| 5,949,415 A | 9/1999 | Lin et al. |
| 5,950,011 A | 9/1999 | Albrecht et al. |
| 5,950,131 A | 9/1999 | Vilmur |
| 5,951,674 A | 9/1999 | Moreno |
| 5,953,322 A | 9/1999 | Kimball |
| 5,956,518 A | 9/1999 | DeHon et al. |
| 5,956,967 A | 9/1999 | Kim |
| 5,959,811 A | 9/1999 | Richardson |
| 5,959,881 A | 9/1999 | Trimberger et al. |
| 5,963,048 A | 10/1999 | Harrison et al. |
| 5,966,534 A | 10/1999 | Cooke et al. |
| 5,970,254 A | 10/1999 | Cooke et al. |
| 5,987,105 A | 11/1999 | Jenkins et al. |
| 5,987,611 A | 11/1999 | Freund |
| 5,991,302 A | 11/1999 | Berl et al. |
| 5,991,308 A | 11/1999 | Fuhrmann et al. |
| 5,993,739 A | 11/1999 | Lyon |
| 5,999,734 A | 12/1999 | Willis et al. |
| 6,005,943 A | 12/1999 | Cohen et al. |
| 6,006,249 A | 12/1999 | Leong |
| 6,016,395 A | 1/2000 | Mohamed |
| 6,018,783 A | 1/2000 | Chiang |
| 6,021,186 A | 2/2000 | Suzuki et al. |
| 6,021,492 A | 2/2000 | May |
| 6,023,742 A | 2/2000 | Ebeling et al. |
| 6,023,755 A | 2/2000 | Casselman |
| 6,028,610 A | 2/2000 | Deering |
| 6,036,166 A | 3/2000 | Olson |
| 6,039,219 A | 3/2000 | Bach et al. |
| 6,041,322 A | 3/2000 | Meng et al. |
| 6,041,970 A | 3/2000 | Vogel |
| 6,046,603 A | 4/2000 | New |
| 6,047,115 A | 4/2000 | Mohan et al. |
| 6,052,600 A | 4/2000 | Fette et al. |
| 6,055,314 A | 4/2000 | Spies et al. |
| 6,056,194 A | 5/2000 | Kolls |
| 6,059,840 A | 5/2000 | Click, Jr. |
| 6,061,580 A | 5/2000 | Altschul et al. |
| 6,073,132 A | 6/2000 | Gehman |
| 6,076,174 A | 6/2000 | Freund |
| 6,078,736 A | 6/2000 | Guccione |
| 6,085,740 A | 7/2000 | Ivri et al. |
| 6,088,043 A | 7/2000 | Kelleher et al. |
| 6,091,263 A | 7/2000 | New et al. |
| 6,091,765 A | 7/2000 | Pietzold, III et al. |
| 6,094,065 A | 7/2000 | Tavana et al. |
| 6,094,726 A | 7/2000 | Gonion et al. |
| 6,111,893 A | 8/2000 | Volftsun et al. |
| 6,111,935 A | 8/2000 | Hughes-Hartogs |
| 6,115,751 A | 9/2000 | Tam et al. |
| 6,119,178 A | 9/2000 | Martin et al. |
| 6,120,551 A | 9/2000 | Law et al. |
| 6,122,670 A | 9/2000 | Bennett et al. |
| 6,128,307 A | 10/2000 | Brown |
| 6,134,605 A | 10/2000 | Hudson et al. |
| 6,134,629 A | 10/2000 | L'Ecuyer |
| 6,138,693 A | 10/2000 | Matz |
| 6,141,283 A | 10/2000 | Bogin et al. |
| 6,150,838 A | 11/2000 | Wittig et al. |
| 6,154,492 A | 11/2000 | Araki et al. |
| 6,154,494 A | 11/2000 | Sugahara et al. |
| 6,157,997 A | 12/2000 | Oowaki et al. |
| 6,173,389 B1 | 1/2001 | Pechanek et al. |
| 6,175,854 B1 | 1/2001 | Bretscher |
| 6,175,892 B1 | 1/2001 | Sazzad et al. |
| 6,181,981 B1 | 1/2001 | Varga et al. |
| 6,185,418 B1 | 2/2001 | MacLellan et al. |
| 6,192,070 B1 | 2/2001 | Poon et al. |
| 6,192,255 B1 | 2/2001 | Lewis et al. |
| 6,192,388 B1 | 2/2001 | Cajolet |
| 6,195,788 B1 | 2/2001 | Leaver et al. |
| 6,198,924 B1 | 3/2001 | Ishii et al. |
| 6,199,181 B1 * | 3/2001 | Rechef et al. .................. 714/38 |
| 6,202,130 B1 | 3/2001 | Scales, III et al. |
| 6,202,189 B1 | 3/2001 | Hinedi et al. |
| 6,219,697 B1 | 4/2001 | Lawande et al. |
| 6,219,756 B1 | 4/2001 | Kasamizugami |
| 6,219,780 B1 | 4/2001 | Lipasti |
| 6,223,222 B1 | 4/2001 | Fijolek et al. |
| 6,226,387 B1 | 5/2001 | Tewfik et al. |
| 6,230,307 B1 | 5/2001 | Davis et al. |
| 6,237,029 B1 | 5/2001 | Master et al. |
| 6,246,883 B1 | 6/2001 | Lee |
| 6,247,125 B1 | 6/2001 | Noel-Baron et al. |
| 6,249,251 B1 | 6/2001 | Chang et al. |
| 6,258,725 B1 | 7/2001 | Lee et al. |
| 6,263,057 B1 | 7/2001 | Silverman |
| 6,266,760 B1 | 7/2001 | DeHon et al. |
| 6,272,579 B1 | 8/2001 | Lentz et al. |
| 6,272,616 B1 | 8/2001 | Fernando et al. |
| 6,281,703 B1 | 8/2001 | Furuta et al. |
| 6,282,627 B1 | 8/2001 | Wong et al. |
| 6,289,375 B1 | 9/2001 | Knight et al. |
| 6,289,434 B1 * | 9/2001 | Roy .......................... 712/32 |
| 6,289,488 B1 | 9/2001 | Dave et al. |
| 6,292,822 B1 | 9/2001 | Hardwick |

| | | | | | | |
|---|---|---|---|---|---|---|
| 6,292,827 B1 | 9/2001 | Raz | | 6,738,744 B2 | 5/2004 | Kirovski et al. |
| 6,292,830 B1 | 9/2001 | Taylor et al. | | 6,748,360 B2 | 6/2004 | Pitman et al. |
| 6,301,653 B1 | 10/2001 | Mohamed et al. | | 6,751,723 B1 | 6/2004 | Kundu et al. |
| 6,305,014 B1 | 10/2001 | Roediger et al. | | 6,754,470 B2 | 6/2004 | Hendrickson et al. |
| 6,311,149 B1 | 10/2001 | Ryan et al. | | 6,760,587 B2 | 7/2004 | Holtzman et al. |
| 6,321,985 B1 | 11/2001 | Kolls | | 6,760,833 B1 | 7/2004 | Dowling |
| 6,326,806 B1 | 12/2001 | Fallside et al. | | 6,766,165 B2 | 7/2004 | Sharma et al. |
| 6,346,824 B1 | 2/2002 | New | | 6,778,212 B1 | 8/2004 | Deng et al. |
| 6,347,346 B1 | 2/2002 | Taylor | | 6,785,341 B1 | 8/2004 | Walton et al. |
| 6,349,394 B1 | 2/2002 | Brock et al. | | 6,807,590 B1 | 10/2004 | Carlson et al. |
| 6,353,841 B1 | 3/2002 | Marshall et al. | | 6,819,140 B2 | 11/2004 | Yamanaka et al. |
| 6,356,994 B1 | 3/2002 | Barry et al. | | 6,823,448 B2 | 11/2004 | Roth et al. |
| 6,359,248 B1 | 3/2002 | Mardi | | 6,829,633 B2 | 12/2004 | Gelfer et al. |
| 6,360,256 B1 | 3/2002 | Lim | | 6,832,250 B1 | 12/2004 | Coons et al. |
| 6,360,259 B1 | 3/2002 | Bradley | | 6,836,839 B2 | 12/2004 | Master et al. |
| 6,360,263 B1 | 3/2002 | Kurtzberg et al. | | 6,859,434 B2 | 2/2005 | Segal et al. |
| 6,363,411 B1 | 3/2002 | Dugan et al. | | 6,865,664 B2 | 3/2005 | Budrovic et al. |
| 6,366,999 B1 | 4/2002 | Drabenstott et al. | | 6,871,236 B2 | 3/2005 | Fishman et al. |
| 6,377,983 B1 | 4/2002 | Cohen et al. | | 6,883,074 B2 | 4/2005 | Lee et al. |
| 6,378,072 B1 | 4/2002 | Collins et al. | | 6,883,084 B1 | 4/2005 | Donohoe |
| 6,381,293 B1 | 4/2002 | Lee et al. | | 6,894,996 B2 | 5/2005 | Lee |
| 6,381,735 B1 | 4/2002 | Hunt | | 6,901,440 B1 | 5/2005 | Bimm et al. |
| 6,385,751 B1 | 5/2002 | Wolf | | 6,907,598 B2 | 6/2005 | Fraser |
| 6,405,214 B1 | 6/2002 | Meade, II | | 6,912,515 B2 | 6/2005 | Jackson et al. |
| 6,408,039 B1 | 6/2002 | Ito | | 6,941,336 B1 | 9/2005 | Mar |
| 6,410,941 B1 | 6/2002 | Taylor et al. | | 6,980,515 B1 | 12/2005 | Schunk et al. |
| 6,411,612 B1 | 6/2002 | Halford et al. | | 6,985,517 B2 | 1/2006 | Matsumoto et al. |
| 6,421,372 B1 | 7/2002 | Bierly et al. | | 6,986,021 B2 | 1/2006 | Master et al. |
| 6,421,809 B1 | 7/2002 | Wuytack et al. | | 6,986,142 B1 | 1/2006 | Ehlig et al. |
| 6,426,649 B1 | 7/2002 | Fu et al. | | 6,988,139 B1 | 1/2006 | Jervis et al. |
| 6,430,624 B1 | 8/2002 | Jamtgaard et al. | | 7,032,229 B1 | 4/2006 | Flores et al. |
| 6,433,578 B1 | 8/2002 | Wasson | | 7,044,741 B2 | 5/2006 | Leem |
| 6,434,590 B1 | 8/2002 | Blelloch et al. | | 7,082,456 B2 | 7/2006 | Mani-Meitav et al. |
| 6,438,737 B1 | 8/2002 | Morelli et al. | | 7,139,910 B1 | 11/2006 | Ainsworth et al. |
| 6,456,996 B1 | 9/2002 | Crawford, Jr. et al. | | 7,142,731 B1 | 11/2006 | Toi |
| 6,459,883 B2 | 10/2002 | Subramanian et al. | | 7,249,242 B2 * | 7/2007 | Ramchandran ............. 712/220 |
| 6,467,009 B1 | 10/2002 | Winegarden et al. | | 2001/0003191 A1 | 6/2001 | Kovacs et al. |
| 6,469,540 B2 | 10/2002 | Nakaya | | 2001/0023482 A1 | 9/2001 | Wray |
| 6,473,609 B1 | 10/2002 | Schwartz et al. | | 2001/0029515 A1 | 10/2001 | Mirsky |
| 6,483,343 B1 | 11/2002 | Faith et al. | | 2001/0034795 A1 | 10/2001 | Moulton et al. |
| 6,507,947 B1 | 1/2003 | Schreiber et al. | | 2001/0039654 A1 | 11/2001 | Miyamoto |
| 6,510,138 B1 | 1/2003 | Pannell | | 2001/0048713 A1 | 12/2001 | Medlock et al. |
| 6,510,510 B1 | 1/2003 | Garde | | 2001/0048714 A1 | 12/2001 | Jha |
| 6,538,470 B1 | 3/2003 | Langhammer et al. | | 2001/0050948 A1 | 12/2001 | Ramberg et al. |
| 6,556,044 B2 | 4/2003 | Langhammer et al. | | 2002/0010848 A1 | 1/2002 | Kamano et al. |
| 6,563,891 B1 | 5/2003 | Eriksson et al. | | 2002/0013799 A1 | 1/2002 | Blaker |
| 6,570,877 B1 | 5/2003 | Kloth et al. | | 2002/0013937 A1 | 1/2002 | Ostanevich et al. |
| 6,577,678 B2 | 6/2003 | Scheuermann | | 2002/0015435 A1 | 2/2002 | Rieken |
| 6,587,684 B1 | 7/2003 | Hsu et al. | | 2002/0015439 A1 | 2/2002 | Kohli et al. |
| 6,590,415 B2 | 7/2003 | Agrawal et al. | | 2002/0023210 A1 | 2/2002 | Tuomenoksa et al. |
| 6,601,086 B1 | 7/2003 | Howard et al. | | 2002/0024942 A1 | 2/2002 | Tsuneki et al. |
| 6,601,158 B1 | 7/2003 | Abbott et al. | | 2002/0024993 A1 | 2/2002 | Subramanian et al. |
| 6,604,085 B1 | 8/2003 | Kolls | | 2002/0031166 A1 | 3/2002 | Subramanian et al. |
| 6,604,189 B1 | 8/2003 | Zemlyak et al. | | 2002/0032551 A1 | 3/2002 | Zakiya |
| 6,606,529 B1 | 8/2003 | Crowder, Jr. et al. | | 2002/0035623 A1 | 3/2002 | Lawande et al. |
| 6,611,906 B1 | 8/2003 | McAllister et al. | | 2002/0041581 A1 | 4/2002 | Aramaki |
| 6,615,333 B1 | 9/2003 | Hoogerbrugge et al. | | 2002/0042907 A1 | 4/2002 | Yamanaka et al. |
| 6,618,434 B2 | 9/2003 | Heidari-Bateni et al. | | 2002/0061741 A1 | 5/2002 | Leung et al. |
| 6,618,777 B1 | 9/2003 | Greenfield | | 2002/0069282 A1 | 6/2002 | Reisman |
| 6,640,304 B2 | 10/2003 | Ginter et al. | | 2002/0072830 A1 | 6/2002 | Hunt |
| 6,647,429 B1 | 11/2003 | Semal | | 2002/0078337 A1 | 6/2002 | Moreau et al. |
| 6,653,859 B2 | 11/2003 | Sihlbom et al. | | 2002/0083305 A1 | 6/2002 | Renard et al. |
| 6,675,265 B2 | 1/2004 | Barroso et al. | | 2002/0083423 A1 | 6/2002 | Ostanevich et al. |
| 6,675,284 B1 | 1/2004 | Warren | | 2002/0087829 A1 | 7/2002 | Snyder et al. |
| 6,684,319 B1 | 1/2004 | Mohamed et al. | | 2002/0089348 A1 | 7/2002 | Langhammer |
| 6,691,148 B1 | 2/2004 | Zinky et al. | | 2002/0101909 A1 | 8/2002 | Chen et al. |
| 6,694,380 B1 | 2/2004 | Wolrich et al. | | 2002/0107905 A1 | 8/2002 | Roe et al. |
| 6,711,617 B1 | 3/2004 | Bantz et al. | | 2002/0107962 A1 | 8/2002 | Richter et al. |
| 6,718,182 B1 | 4/2004 | Kung | | 2002/0119803 A1 | 8/2002 | Bitterlich et al. |
| 6,721,286 B1 | 4/2004 | Williams et al. | | 2002/0120672 A1 | 8/2002 | Butt et al. |
| 6,721,884 B1 | 4/2004 | De Oliveira Kastrup Pereira et al. | | 2002/0133688 A1 | 9/2002 | Lee et al. |
| 6,732,354 B2 | 5/2004 | Ebeling et al. | | 2002/0138716 A1 | 9/2002 | Master et al. |
| 6,735,621 B1 | 5/2004 | Yoakum et al. | | 2002/0141489 A1 | 10/2002 | Imaizumi |

| | | | |
|---|---|---|---|
| 2002/0147845 A1 | 10/2002 | Sanchez-Herrero et al. | |
| 2002/0159503 A1 | 10/2002 | Ramachandran | |
| 2002/0162026 A1 | 10/2002 | Neuman et al. | |
| 2002/0168018 A1 | 11/2002 | Scheuermann | |
| 2002/0181559 A1 | 12/2002 | Heidari-Bateni et al. | |
| 2002/0184275 A1 | 12/2002 | Dutta et al. | |
| 2002/0184291 A1 | 12/2002 | Hogenauer | |
| 2002/0184498 A1 | 12/2002 | Qi | |
| 2002/0191790 A1 | 12/2002 | Anand et al. | |
| 2003/0007606 A1 | 1/2003 | Suder et al. | |
| 2003/0012270 A1 | 1/2003 | Zhou et al. | |
| 2003/0018446 A1 | 1/2003 | Makowski et al. | |
| 2003/0018700 A1 | 1/2003 | Giroti et al. | |
| 2003/0023830 A1 | 1/2003 | Hogenauer | |
| 2003/0026242 A1 | 2/2003 | Jokinen et al. | |
| 2003/0030004 A1 | 2/2003 | Dixon et al. | |
| 2003/0046421 A1 | 3/2003 | Horvitz et al. | |
| 2003/0061260 A1 | 3/2003 | Rajkumar | |
| 2003/0061311 A1 | 3/2003 | Lo | |
| 2003/0063656 A1 | 4/2003 | Rao et al. | |
| 2003/0074473 A1 | 4/2003 | Pham et al. | |
| 2003/0076815 A1 | 4/2003 | Miller et al. | |
| 2003/0099223 A1 | 5/2003 | Chang et al. | |
| 2003/0102889 A1 | 6/2003 | Master et al. | |
| 2003/0105949 A1 | 6/2003 | Master et al. | |
| 2003/0110485 A1 | 6/2003 | Lu et al. | |
| 2003/0131162 A1 | 7/2003 | Secatch et al. | |
| 2003/0142818 A1 | 7/2003 | Raghunathan et al. | |
| 2003/0154357 A1 | 8/2003 | Master et al. | |
| 2003/0163723 A1* | 8/2003 | Kozuch et al. | 713/200 |
| 2003/0172138 A1 | 9/2003 | McCormack et al. | |
| 2003/0172139 A1 | 9/2003 | Srinivasan et al. | |
| 2003/0200538 A1 | 10/2003 | Ebeling et al. | |
| 2003/0212684 A1 | 11/2003 | Meyer et al. | |
| 2003/0229864 A1 | 12/2003 | Watkins | |
| 2004/0006584 A1 | 1/2004 | Vandeweerd | |
| 2004/0010645 A1 | 1/2004 | Scheuermann et al. | |
| 2004/0015970 A1 | 1/2004 | Scheuermann | |
| 2004/0025159 A1 | 2/2004 | Scheuermann et al. | |
| 2004/0057505 A1 | 3/2004 | Valio | |
| 2004/0062300 A1 | 4/2004 | McDonough et al. | |
| 2004/0081248 A1 | 4/2004 | Parolari | |
| 2004/0093479 A1 | 5/2004 | Ramchandran | |
| 2004/0133745 A1 | 7/2004 | Ramchandran | |
| 2004/0168044 A1 | 8/2004 | Ramchandran | |
| 2005/0044344 A1 | 2/2005 | Stevens | |
| 2005/0166038 A1 | 7/2005 | Wang et al. | |
| 2005/0166073 A1 | 7/2005 | Lee | |
| 2005/0198199 A1 | 9/2005 | Dowling | |
| 2006/0031660 A1 | 2/2006 | Master et al. | |

FOREIGN PATENT DOCUMENTS

| | | |
|---|---|---|
| EP | 0 301 169 A1 | 2/1989 |
| EP | 0 166 586 B1 | 1/1991 |
| EP | 0 236 633 B1 | 5/1991 |
| EP | 0 478 624 B1 | 4/1992 |
| EP | 0 479 102 A2 | 4/1992 |
| EP | 0 661 831 A2 | 7/1995 |
| EP | 0 668 659 A2 | 8/1995 |
| EP | 0 690 588 A2 | 1/1996 |
| EP | 0 691 754 A2 | 1/1996 |
| EP | 0 768 602 A2 | 4/1997 |
| EP | 0 817 003 A2 | 1/1998 |
| EP | 0 821 495 A2 | 1/1998 |
| EP | 0 866 210 A2 | 9/1998 |
| EP | 0 923 247 A2 | 6/1999 |
| EP | 0 926 596 A2 | 6/1999 |
| EP | 1 056 217 A2 | 11/2000 |
| EP | 1 061 437 A1 | 12/2000 |
| EP | 1 061 443 A2 | 12/2000 |
| EP | 1 126 368 A2 | 8/2001 |
| EP | 1 150 506 A2 | 10/2001 |
| EP | 1 189 358 A1 | 3/2002 |
| GB | 2 067 800 A | 7/1981 |
| GB | 2 237 908 A | 5/1991 |
| JP | 62-249456 | 10/1987 |
| JP | 63-147258 | 6/1988 |
| JP | 4-51546 | 2/1992 |
| JP | 7-064789 | 3/1995 |
| JP | 7066718 | 3/1995 |
| JP | 10233676 | 9/1998 |
| JP | 10254696 | 9/1998 |
| JP | 11296345 | 10/1999 |
| JP | 2000315731 | 11/2000 |
| JP | 2001-053703 | 2/2001 |
| WO | WO 89/05029 A1 | 6/1989 |
| WO | WO 89/11443 A2 | 11/1989 |
| WO | WO 91/00238 A1 | 1/1991 |
| WO | WO 93/13603 A1 | 7/1993 |
| WO | WO 95/11855 A1 | 5/1995 |
| WO | WO 96/33558 A1 | 10/1996 |
| WO | WO 98/32071 A3 | 7/1998 |
| WO | WO 99/03776 A1 | 1/1999 |
| WO | WO 99/21094 A2 | 4/1999 |
| WO | WO 99/26860 A1 | 6/1999 |
| WO | WO 99/65818 A1 | 12/1999 |
| WO | WO 00/19311 A1 | 4/2000 |
| WO | WO 00/65855 A1 | 11/2000 |
| WO | WO 00/69073 A1 | 11/2000 |
| WO | WO 01/11281 A1 | 2/2001 |
| WO | WO 01/22235 A1 | 3/2001 |
| WO | WO 01/76129 A2 | 10/2001 |
| WO | WO 02/12978 A2 | 2/2002 |

OTHER PUBLICATIONS

Mirsky et al "A reconfigurable computing architecture with configurable instruction distribution and deployable resources", Apr. 1996.*

Abnous et al., "Ultra-Low-Power Domain-Specific Multimedia Processors," VLSI Signal Processing, IX, 1998, IEEE Workshop in San Francisco, CA, USA, Oct. 30-Nov. 1, 1998, pp. 461-470 (Oct. 30, 1998).

Aggarwal et al.., "Efficient Huffman Decoding," International Conference on Image Processing IEEE 1:936-939 (Sep. 10-13, 2000).

Allan et al., "Software Pipelining," ACM Computing Surveys, 27(3):1-78 (Sep. 1995).

Alsolaim et al., "Architecture and Application of a Dynamically Reconfigurable Hardware Array for Future Mobile Communication Systems," Field Programmable Custom Computing Machines, 2000 IEEE Symposium, Napa Valley, Los Alamitos, CA. IEEE Comput. Soc. pp. 205-214 (Apr. 17-19, 2000).

Ashenden et al., "The VHDL Cookbook," Dept. Computer Science, University of Adelaide, South Australia. Downloaded from http://tams-www.informatik.uni-hamburg.de/vhdl/doc/cookbook/VHDL-Cookbook.pdf on Dec. 7, 2006 (Jul. 1990).

Bacon et al., "Compiler Transformations for High-Performance Computing," ACM Computing Surveys 26(4):368-373 (Dec. 1994).

Balasubramonian et al., "Reducing the Complexity of the Register File in Dynamic Superscalar Processors," Proceedings of the 34th Annual ACM/IEEE International Symposium on Microarchitecture, pp. 237-248 (Dec. 1, 2001).

Banerjee et al., "A MATLAB Compiler for Distributed, Heterogeneous, Reconfigurable Computing Systems," 2000 IEEE Symposium, pp. 39-48, (Apr. 17-19, 2000).

Bapte et al., "Uniform Execution Environment for Dynamic Reconfiguration," Darpa Adaptive Computing Systems, http://isis.vanderbilt.edu/publications/archive/babty_T_#_0_1999_Uniform_Ex.pdf, pp. 1-7 (1999).

Baumgarte et al., "PACT XPP—A Self-Reconfigurable Data Processing Architecture," NN www.pactcorp.com/sneu/download/ersa01.pdf; retrieved on Nov. 25, 2005 (Jun. 25, 2001).

Becker et al., "An Application-Tailored Dynamically Reconfigurable Hardware Architecture for Digital Baseband Processing," IEEE Conference Proceedings Article pp. 341-346 (Sep. 18, 2000).

Becker et al., "Design and Implementation of a Coarse-Grained Dynamically Reconfigurable Hardware Architecture," VLSI 2001, Proceedings IEEE Computer Soc. Workshop, Piscataway, NJ, USA, pp. 41-46 (Apr. 19-20, 2001).

BevStar, BevStar Bottled Water Model Advertisement *Automatic Merchandiser* at www.AMonline.com (2005).

BevStar, BevStar Point of Use Water Model Advertisement *Automatic Merchandiser* at www.AMonline.com (2005).

Bishop & Loucks, "A Heterogeneous Environment for Hardware/Software Cosimulation," Proceedings of the 30th Annual Simulation Symposium, pp. 14-22 (Apr. 7-9, 1997).

Brakensiek et al., "Re-Configurable Multi-Standard Terminal for Heterogeneous Networks," Radio and Wireless Conference, Rawcon 2002 IEEE. pp. 27-30 (2002).

Brown et al., "Quick PDA Data Exchange," PC Magazine pp. 1-3 (May 22, 2001).

Buck et al., "Ptolemy: A Framework for Simulating and Prototyping Heterogeneous Systems," International Journal of Computer Simulation 4:155-182 (Apr. 1994).

Burns et al., "A Dynamic Reconfiguration Run-Time System," Proceedings of the 5th Annual Symposium on Field-Programmable Custom Computing Machines, pp. 1 66-75 (Apr. 16, 1997).

Business Wire, "Whirlpool Internet-Enabled Appliances to Use Beeline Shopper Software Features," http://www.whirlpoocorp.com/news/releases/release.asp?rid=90 (Feb. 16, 2001).

Buttazzo et al., "Optimal Deadline Assignment for Scheduling Soft Aperiodic Tasks in Hard Real-Time Environments," Engineering of Complex Computer Systems, Proceedings of the Third IEEE International Conference on Como, pp. 39-48 (Sep. 8, 1997).

Callahan et al., "Adapting Software Pipelining for Reconfigurable Computing," in Proceedings of the International Conference on Compilers, Architectrue and Synthesis for Embedded Systems p. 8, ACM (Cases '00, San Jose, CA) (Nov. 17-18, 2000).

Chapman & Mehrotra, "OpenMP and HPF: Integrating Two Paradigms," Proceedings of the 4th International Euro-Par Conference (Euro-Par'98), Springer-Verlag Heidelberg, Lecture Notes in Computer Science 1470:650-658 (1998).

Chen et al., "A Reconfigurable Multiprocessor IC for Rapid Prototyping of Algorithmic-Specific High-Speed DSP Data Paths," IEEE Journal of Solid-State Circuits, IEEE 35:74-75 (Feb. 1, 2001).

Clarke, "Embedded Solutions Enters Development Pact with Marconi," EETimes Online (Jan. 26, 2000).

Compton & Hauck, "Reconfigurable Computing: A Survey of Systems and Software," ACM Press, ACM Computing Surveys (CSUR) 34(2):171-210 (Jun. 2002).

Compton et al., "Configuration Relocation and Defragmentation for Run-Time Reconfigurable Computing," Northwestern University, http://citeseer.nj.nec.com/compton00configuration.html, pp. 1-17 (2000).

Conte et al., "Dynamic Rescheduling: A Technique for Object Code Compatibility in VLIW Architectures," Proceedings of the 28th Annulal International Symposium on Microarchitecture pp. 208-218 (Nov. 29, 1995).

Conte et al., "Instruction Fetch Mechanisms for VLIW Architectures with Compressed Encodings," Proceedings of the Annual IEEE/ACM International Symposium on Microarchitecture (Micro) 29:201-211 (Dec. 2, 1996).

Cray Research Inc., "Cray T3E Fortran Optimization Guide," Ver. 004-2518-002, Section 4.5 (Jan. 1999).

Cummings et al., "FPGA in the Software Radio," IEEE Communications Magazine. 37(2):108-112 (Feb. 1999).

Dandalis et al., "An Adaptive Cryptograhic Engine for IPSec Architectures," IEEE pp. 132-141 (Jan. 2000).

David et al., "DART: A Dynamically Reconfigurable Architecture Dealing with Future Mobile Telecommunication Constraints," Proceedings of the International Parallel and Distributed Processing Symposium pp. 156-163 (Apr. 15, 2002).

Deepakumara et al., "FPGA Implementation of MD5 has Algorithm," Canadian Conference on Electrical and Computer Engineering, IEEE (2001).

Dehon et al., "Reconfigurable Computing: What, Why and Implications for Design Automation," Design Automation Conference Proceedings pp. 610-615 (1999).

Dipert, "Figuring Out Reconfigurable Logic," EDN 44(16):107-114 (Aug. 5, 1999).

Dominikus, "A Hardware Implementation of MD4-Family Hash Algorithms," 9th International Conference on Electronics, Circuits and Systems IEEE (2002).

Dorband, "aCe C Language Reference Guide," Online (Archived Mar. 2001), http://web.archive.org/web/20000616053819/http://newton.gsfc.nasa.gov/aCe/aCe_dir/aCe_cc_Ref.html (Mar. 2001).

Drozdowski, "Scheduling Multiprocessor Tasks—An Overview," Instytut Informatyki Politechnika, pp. 1-31 (Jan. 31, 1996).

Ebeling et al., "RaPiD Reconfigurable Pipelined Datapath," Springer-Verlag, 6th International Workshop on Field-Programmable Logic and Applications pp. 126-135 (1996).

Fawer et al., "A Multiprocessor Approach for Implementing a Time-Diversity Spread Specturm Receiver," Proceeding sof the 1990 International Zurich Seminal on Digital Communications, pp. 173-180 (Mar. 5-8, 1990).

Fisher, "Gone Flat," Forbes pp. 76-79 (Oct. 2001).

Fleischmann et al., "Prototyping Networked Embedded Systems," Integrated Engineering, pp. 116-119 (Feb. 1999).

Forbes " Best of the Web—Computer Networking/Consumer Durables," *The Forbes Magnetic 40* p. 80 (May 2001).

Gibson, "Fresh Technologies Will Create Myriad Functions," FT Information Technology Review; World Wide Web at http://technews.acm.org/articles/2000-2/0301w.html?searchterm=%22fresh+technologies%22 (Mar. 1, 2000).

Gluth, "Integrierte Signalprozessoren," Elektronik 35(18):112-118 Franzis Verlag GMBH, Munich, Germany (Sep. 5, 1986).

Gokhale & Schlesinger, "A Data Parallel C and Its Platforms," Proceedings of the Fifth Symposium on the Frontiers of Massively Parallel Computation pp. 194-202 (Frontiers '95) (Feb. 1995).

Grimm et al., "A System Architecture for Pervasive Computing," Washington University, pp. 1-6 (Sep. 2000).

Halbwachs et al., "The Synchronous Data Flow Programming Language LUSTRE," Proceedings of the IEEE 79(9):1305-1319 (Sep. 1991).

Hammes et al., "Cameron: High Level Language Compilation for Reconfigurable Systems," Proc. of the Intl. Conf. on Parallel Architectures and Compilation Techniques, pp. 236-244 (Oct. 1999).

Hartenstein, "Coarse Grain Reconfigurable Architectures," Design Automation Conference, 2001. Proceedings of the ASP-Dac 2001, Asian and South Pacific Jan. 30, 2001-Feb. 2, 2001, Piscataway, NJ, US, IEEE, pp. 564-569 (Jan. 30, 2001).

Heinz, "An Efficiently Compilable Extension of {M}odula-3 for Problem-Oriented Explicitly Parallel Programming," Proceedings of the Joint Symposium on Parallel Processing (May 1993).

Hinden et al., "The DARPA Internet: Interconnecting Heterogeneous Computer Networks with Gateways," IEEE Computer Magazine pp. 38-48 (1983).

Horton, "Beginning Java 2: JDK 1.3 Edition," Wrox Press, Chapter 8, pp. 313-316 (Feb. 2001).

Huff et al., "Lifetime-Sensitive Modulo Scheduling," 6th Conference on Programming Language, Design and Implementation, pp. 258-267, ACM (1993).

IBM, "Multisequencing a Single Instruction Stream Scheduling with Space-time Trade-offs," IBM Technical Disclosure Bulletin 36(2):105-108 (Feb. 1, 1993).

IEEE, "IEEE Standard Verilog Hardware Description Language," downloaded from http://inst.eecs.berkeley.edu/~cs150/fa06/Labs/verilog-ieee.pdf on Dec. 7, 2006 (Sep. 2001).

Internet Wire, Sunbeam Joins Microsoft in University Plug and Play Forum to Establish A "Universal" Smart Appliance Technology Standard (Mar. 23, 2000).

Ishii et al., "Parallel Variable Length Decoding with Inverse Quantization for Software MPEG-2 Decoders," Workshop on Signal Processing Systems, Design and Implementation, IEEE pp. 500-509 (Nov. 3-5, 1997).

Isoworth, "Isoworth Beverage Dispensing Technology Worldwide Company," Brochure (May 22, 2000).

Jain et al., "An Alternative Approach Towards the Design of Control Units," Microelectronics and Reliability 24(6):1009-1012 (1984).

Jain, "Parallel Processing with the TMS320C40 Parallel Digital Signal Processor," Sonitech International Inc., pp. 13-46. Retrieved from: http://www-s.ti.com/sc/psheets/spra031/spra031.pdf retrieved on Apr. 14, 2004 (Feb. 1994).

Janssen et al., "Partitioned Register File for TTAs," Proceedings of the 28th Annual International Symposium on Microarchitecture, pp. 303-312 (Nov. 1995).

Jong-Pyng et al., "Real-Time Virtual Channel Flow Control," Proceedings of the Annual International Phoenix Conference on Computers and Communications, Conf. 13, pp. 97-103 (Apr. 12, 1994).

Jung et al., "Efficient Hardware Controller Synthesis for Synchronous Dataflow Graph in System Level Design," Proceedings of the 13th International Symposium on System Synthesis pp. 79-84 (ISSS'00) (Sep. 2000).

Kaufmann et al., "Digital Spread-Spectrum Multipath-Diversity Receiver for Indoor Communication," from Pioneers to the 21st Century; Denver, Proceedings of the Vehicular Technology Socity [sic] Conference, NY, IEEE, US 2(Conf. 42):1038-1041 (May 10-13, 1992).

Kneip et al., "An Algorithm Adapted Autonomous Controlling Concept for a Parallel Single-Chip Digital Signal Processor," Journal of VLSI Signal Processing Systems for Signal, Image, an dVideo Technology 16(1):31-40 (May 1, 1997).

Lee & Messerschmitt, "Pipeline Interleaved Programmable DSP's: Synchronous Data Flow Programming," IEEE Transactions on Acoustics, Speech, and Signal Processing ASSP-35(9):1334-1345 (Sep. 1987).

Lee & Messerschmitt, "Synchronous Data Flow," Proceedings of the IEEE 75(9):1235-1245 (Sep. 1987).

Lee & Parks, "Dataflow Process Networks," Proceedings of the IEEE 83(5):773-799 (May 1995).

Liu et al, "Scheduling Algorithms for Multiprogramming in a Hard-Real-Time Environment," *Journal of the Association for Computing* 20(1):46-61 (1973).

Llosa et al., "Lifetime-Sensitive Modulo Scheduling in a Production Environment," IEEE Trans. on Comps. 50(3):234-249 (Mar. 2001).

Lu et al., "The Morphosys Dynamically Reconfigurable System-On-Chip," Proceedings of the First NASA/DOD Workshop on Evolvable Hardware, pp. 152-160 (Jul. 19, 1999).

Mangione-Smith et al., "Seeking Solutions in Configurable Computing," *Computer* 30(12):38-43 (Dec. 1997).

Manion, "Network CPU Adds Spice," Electronic Engineering Times, Issue 1126 (Aug. 14, 2000).

Mascia & Ishii., "Neural Net Implementation on Single-Chip Digital Signal Processor," IEEE (1989).

McGraw, "Parallel Functional Programming in Sisal: Fictions, Facts, and Future," Lawrence Livermore National Laboratory pp. 1-40 (Jul. 1993).

Najjar et al., "High-Level Language Abstraction for Reconfigurable Computing," *Computer* 36(8):63-69 (Aug. 2003).

Nichols et al., "Data Management and Control-Flow Constructs in a SIMD/SPMD Parallel Language/Compiler," Proceedings of the 3rd Symposium on the Frontiers of Massively Parallel Computation pp. 397-406 (Oct. 1990).

OpenMP Architecture Review Board, "OpenMP C and C++ Application Program Interface," pp. 7-16 (Oct. 1998).

Oracle Corporation, "Oracle8i JDBC Developer's Guide and Reference," Release 3, 8.1.7, pp. 10-8-10-10 (Jul. 2000).

Pauer et al., "Algorithm Analysis and Mapping Environment for Adaptive Computing Systems: Further Results," Proc. IEEE Symposium on FPGA's for Custom Computing Machines (FCCM), Napa CA (1999).

Pauer et al., "Algorithm Analysis and Mapping Environment for Adaptive Computing Systems," Presentation slides, Third Bi-annual Ptolemy Miniconference (1999).

Ramamritham et al., "On Scheduling Algorithms for Real-Time Multiprocessor Systems," Algorithms and Applications, Proceedings of the International conference on Parallel Processing 3:143-152 (Aug. 8, 1989).

Schneider, "A Parallel/Serial Trade-Off Methodology for Look-Up Table Based Decoders," Proceedings of the Design Automation Conference 34:498-503 (Jun. 9-13, 1997).

Sidhu et al., "A Self-Reconfigurable Gate Array Architecture," 10 International Workshop on Field Programmable Logic and Applications http://coblitz.codeen.org:3125/citeseer.ist.psu.edu/cache/papers/cs/17524/http:zSzzSzmaarcii.usc.eduzSzPublicationsZSzsidhu_fp100.pdf/sidhu00selfreconfigurable.pdf retrieved on Jun. 21, 2006 (Sep. 1, 2001).

Smith, "Intro to ASICs: ASIC Cell Libraries," at http://iroi.seu.edu.cn/books/asics/Book2/CH01/CH01.5.htm, printed on Feb. 4, 2005 (Jun. 1997).

Souza, " Computing's New Face—Reconfigurable Devices Could Rattle Supply Chain," Electronic Buyers' News Issue 1205, p. P.1 (Apr. 3, 2000).

Souza, "Quicksilver Buys White Eagle," Electronic Buyers News, Issue 1220 (Jul. 17, 2000).

Sriram et al., "MPEG-2 Video Decoding on the TMS320C6X DSP Architecture," Conference Record of the 32nd Asilomar Conference on Signals, Systems, and Computers, IEEE pp. 1735-1739 (Nov. 1-4, 1998).

Steiner, "Coke Chief's Latest Daft Idea—A Cola Tap in Every House," Sunday Times (Mar. 2001).

Sun Microsystems, "Fortran 3.0.1 User's Guide, Revision A," pp. 57-68 (Aug. 1994).

Svensson, "Co's Join On Home Web Wiring Network," Associated Press Online printed on Apr. 30, 2008 (Jun. 2000).

Tang et al., "Thread Partitioning and Scheduling Based on Cost Model," Proceedings of the Ninth Annual ACM Symposium on Parallel Algorithms and Architectures, pp. 272-281 Retrieved from: http://doi.acm.org/10.1145/258492.2585 retrieved on Aug. 25, 2004 (1997).

Vaya, "Viturbo: A Reconfigurable Architecture for Ubiquitous Wireless Networks," A Thesis Submitted in Partial Fulfillment of the Requirements for the Degree Master of Science; Rice University (Aug. 2002).

Wang et al, "Cell Search in W-CDMA," IEEE Journal on Selected Areas in Communications 18(8):1470-1482 (Aug. 2000).

Wardell, "Help for Hurried Cooks?," Popular Science, p. 32 (May 2000).

Whiting & Pascoe, "A History of Data-Flow Languages," IEEE Annals of the History of Computing 16(4):38-59 (1994).

Williamson & Lee, "Synthesis of Parallel Hardware Implementations from Synchronous Dataflow Graph Specifications," Conference Record of the Thirtieth Asilomar Conference on Signals, Systems and Computers 1340-1343 (Nov. 1996).

Wirthlin et al., "A Dynamic Instruction Set Computer," Proceedings of the IEEE Symposium on FPGA's for Custom Computing Machines, pp. 99-107 (Apr. 21, 1995).

WWW.APPLIANCEMAGAZINE.COM, World Wide Web at http://web.archive.org/web/20000511085402/http://www.appliancemagazine.com/ printed on Apr. 30, 2008.

WWW.BESTROM.COM, BreakMateTM from www.bestrom.com printed on Apr. 29, 2008.

WWW.BEVERAGEEXPRESS.COM, Beverage Express from www.beverageexpress.com printed on Apr. 30, 2008.

WWW.BEVSTAR.COM, Isoworth Beverage Dispensing Technology Worldwide from www.bevstarcom printed on Apr. 30, 2008.

WWW.BONATOR.COM, from The World Wide Web at http://web.archive.org/web/20000510102440/http://www.bonator.com/ printed on Apr. 30, 2008.

WWW.ECOMMERCE.DEWPOINTINIC.COM, Swiss Mountain Coffees from www.ecommerce.dewpointinc.com printed on Apr. 30, 2008.

WWW.GATEWAY.COM, World Wide Web, http://web.archive.org/web/20000229192734/www.gateway.com/productpages/9300splash/index.shtml Available on Mar. 3, 2000, 1 page (Mar. 3, 2000).

WWW.ICL.COM, from the World Wide Web at http://www.icl.com printed on Apr. 30, 2008.

WWW.MARGHERITA2000.COM; from Margherita2000.com printed Apr. 30, 2008 (Jan. 26, 2001).

WWW.SODACLUBENTERPRISES.COM, Soda-Club Enterprises from www.sodaclubenterprises.com printed on Apr. 30, 2008.

WWW.SYMBOL.COM, Symbol from www.symbol.com printed on Apr. 30, 2008.
WWW.WUNDERBAR.COM, Wunder-Bar Dispensing Systems from www.wunderbar.com printed on Apr. 30, 2008.
Xilinx, "Virtex-II Pro Platform FPGAs: Functional Description DS083-2 (v2.5)," Product Specification, pp. 13-46 (Jan. 20, 2003).
Young, "Architecture Powers up IPSec, SSL," EETimes, Los Gatos, CA, pp. 1-4 http://www.eetimes.com/story/OEG20011102S0065 (Nov. 2, 2001).
Yuan et al., "A Decomposition Approach to Non-Preemptive Real-Time Scheduling," Real Time Systems 6(1):7-35 (1994).
Zaino et al., "Algorithm Analysis and Mapping Environment for Adaptive Computing Systems," Final Technical Report, DARPA Contract F33615-97-C-1174 (Sep. 2001).
Zhang et al., "A 1V Heterogeneous Reconfigurable Processor IC for Baseband Wireless Applications," 2000 IEEE Solid.
Altera Apex 20K 1999.
Andraka Consulting Group, "Distributed Arithmetic," Obtained from: http://www.fpga-guru.com/distribu.htm (1998-2000).

Computer Organization and Design $2^{nd}$ Edition, Hennessy, Morgan Kaufmann Publishers, pp. 569-570 (1998).
Free On-Line Dictionary of Computing. © 1995-2000 www.foldoc.org search terms: cache, operating system, Internet, DMA, interrupt.
Hanna et al., "A Normalized Backpropagation Learning Algorithm for Multilayer Feed-Forward Neural Adaptive Filters," *Neural Networks for Signal Processing XI*, Proceedings of the 2001 IEEE Signal Processing Society Workshop pp. 63-72 (Sep. 2001).
Janweijer et al., "A Compact Robin Using the SHarc (CRUSH)," Obtained from: http://www.nikhef.nl/~peterj/Crush/CRUSH-hw.pdf (Sep. 1998).
Rajagopalan et al., "A Flexible Multiplication Unit for an FPGA Logic Block," *Circuits and Systems* 4:546-9 (2001).
Xilinx Data Book 1998.
Xilinx Virtex 1.1 1998.
Xilinx Virtex 2.2 2000.

* cited by examiner

METHOD AND SYSTEM FOR ACHIEVING INDIVIDUALIZED PROTECTED SPACE IN AN OPERATING SYSTEM

FIELD OF THE INVENTION

The present invention relates to robust operating system protection.

BACKGROUND OF THE INVENTION

As is generally understood in computing environments, an operating system (O/S) acts as the layer between the hardware and the software providing several important functions. For example, the functionality of an O/S includes device management, process management, communication between processes, memory management, and file systems. Further, certain utilities are standard for operating systems that allow common tasks to be performed, such as file access and organization operations and process initiation and termination.

Within the O/S, the kernel is responsible for all other operations and acts to control the operations following the initialization functions performed by the O/S upon boot-up. The traditional structure of a kernel is a layered system. Some operating systems use a micro-kernel to minimize a size of the kernel while maintaining a layered system, such as the Windows NT operating system. FIG. 1 illustrates an example diagram of a typical layered structure, such as for the Windows NT operating system. As shown, the applications 10 lie above the O/S 20, where each application typically resides in its own memory space. The micro-kernel 30 interacts with a hardware abstraction layer 40 (e.g., with device drivers) associated with hardware layer 50. The line 60 represents a demarcation line indicating the separation between which normally is considered the user space of the applications, and the protected space of the operating system.

While the typical structure provides a well-understood model for an operating system, some problems remain. One such problem is the potential for crashing the machine once access below the demarcation line 60 is achieved. For example, bugs in programs that are written for performing processes below the demarcation line, e.g., device drivers that interact with the hardware abstraction layer, protocol stacks between the kernel and the applications, etc., can bring the entire machine down. While some protection is provided in operating systems with the generation of exceptions in response to certain illegal actions, such as memory address violations or illegal instructions, which trigger the kernel and kill the application raising the exception, there exists an inability by operating systems to protect against the vulnerability to fatal access.

An approach to avoiding such vulnerability is to limit which software is trusted within an operating system and utilizing control mechanisms that check all other programming prior to processing. Relying on software to perform such checks reduces the ability to limit the amount of software that is trusted. A hardware solution would be preferable, but, heretofore, has been prohibitive due to the level of instantaneous hardware machine generation that would be necessary.

Accordingly, what is needed is an ability to achieve a protected operating system through on demand hardware monitoring. The present invention addresses such a need.

SUMMARY OF THE INVENTION

Aspects for achieving individualized protected space in an operating system are provided. The aspects include performing on demand hardware instantiation via an ACE (an adaptive computing engine), and utilizing the hardware for monitoring predetermined software programming to protect an operating system.

Through the present invention, all elements outside a system's own code for operating, e.g., all the stacks, abstraction layers, and device drivers, can be readily and reliably monitored. In this manner, the vulnerability present in most current operating systems due to unchecked access below the demarcation line is successfully overcome. Further, the reconfigurability of the ACE architecture allows the approach to adjust as desired with additions/changes to an operating system environment. These and other advantages will become readily apparent from the following detailed description and accompanying drawings.

DETAILED DESCRIPTION OF THE INVENTION

The present invention relates to achieving individualized protected space in an operating system via an adaptive computing engine (ACE). The following description is presented to enable one of ordinary skill in the art to make and use the invention and is provided in the context of a patent application and its requirements. Various modifications to the preferred embodiment and the generic principles and features described herein will be readily apparent to those skilled in the art. Thus, the present invention is not intended to be limited to the embodiment shown but is to be accorded the widest scope consistent with the principles and features described herein.

In a preferred embodiment, the processing core of an embedded system is achieved through an adaptive computing engine (ACE). A more detailed discussion of the aspects of an ACE are provided in co-pending U.S. patent application Ser. No. 10/384,486 entitled ADAPTIVE INTEGRATED CIRCUITRY WITH HETEROGENEOUS AND RECONFIGURABLE MATRICES OF DIVERSE AND ADAPTIVE COMPUTATIONAL UNITS HAVING FIXED, APPLICATION SPECIFIC COMPUTATIONAL ELEMENTS, filed Mar. 7, 2003, assigned to the assignee of the present invention, and incorporated herein in its entirety. Generally, the ACE provides a significant departure from the prior art for achieving processing in an embedded system, in that data, control and configuration information are transmitted between and among its elements, utilizing an interconnection network, which may be configured and reconfigured, in real-time, to provide any given connection between and among the elements. In order to more fully illustrate the aspects of the present invention, portions of the discussion of the ACE from the application incorporated by reference are included in the following.

Figure 2:
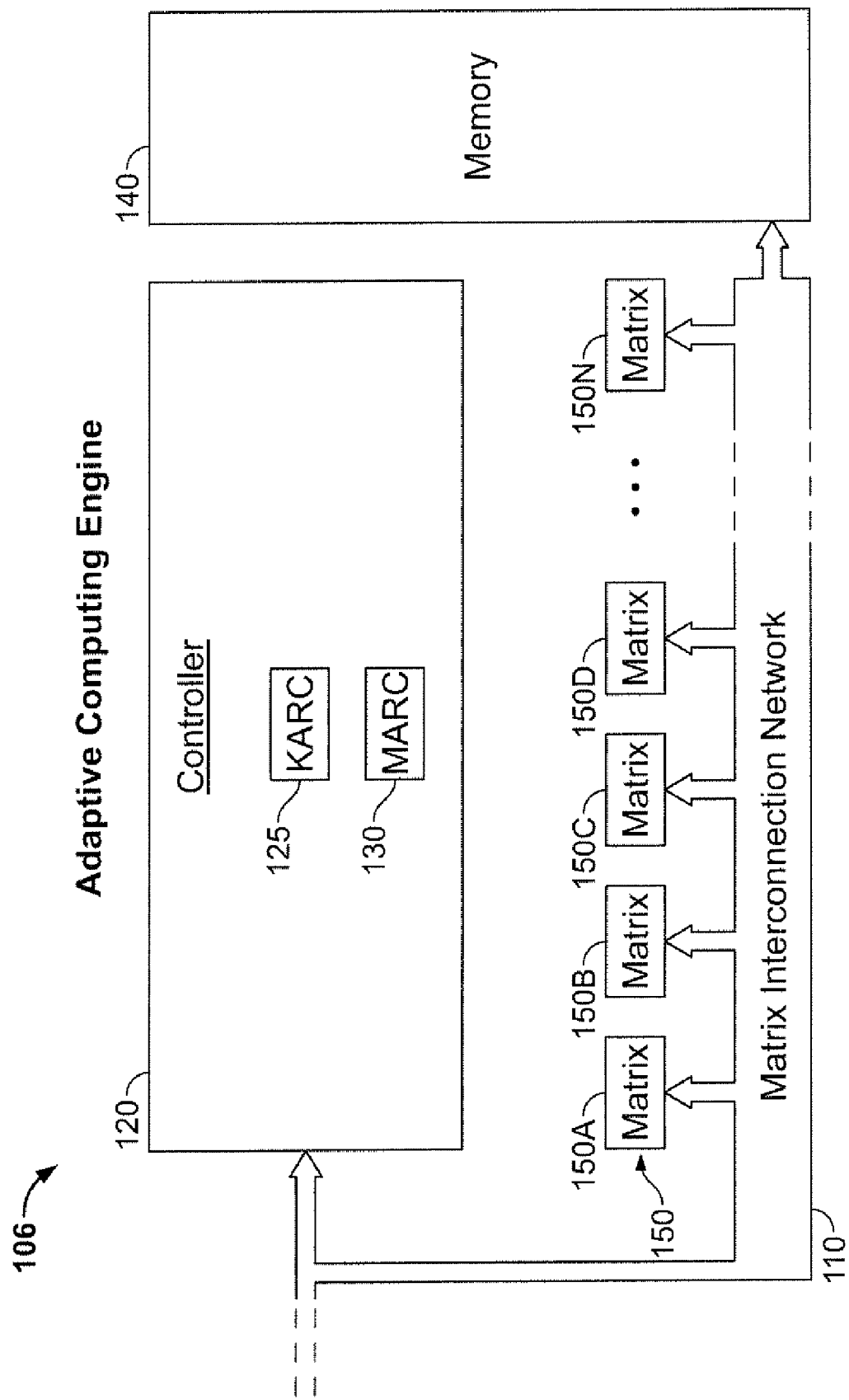
FIG. 2 is a block diagram illustrating an adaptive computing engine.

FIG. 2 is a block diagram illustrating an adaptive computing engine ("ACE") 106 that includes a controller 120, one or more reconfigurable matrices 150, such as matrices 150A through 150N as illustrated, a matrix interconnection network 110, and preferably also includes a memory 140.

The controller 120 is preferably implemented as a reduced instruction set ("RISC") processor, controller or other device or IC capable of performing the two types of functionality discussed below. The first control functionality, referred to as "kernal" control, is illustrated as kernal controller ("KARC") 125, and the second control functionality, referred to as "matrix" control, is illustrated as matrix controller ("MARC") 130.

Figure 3:
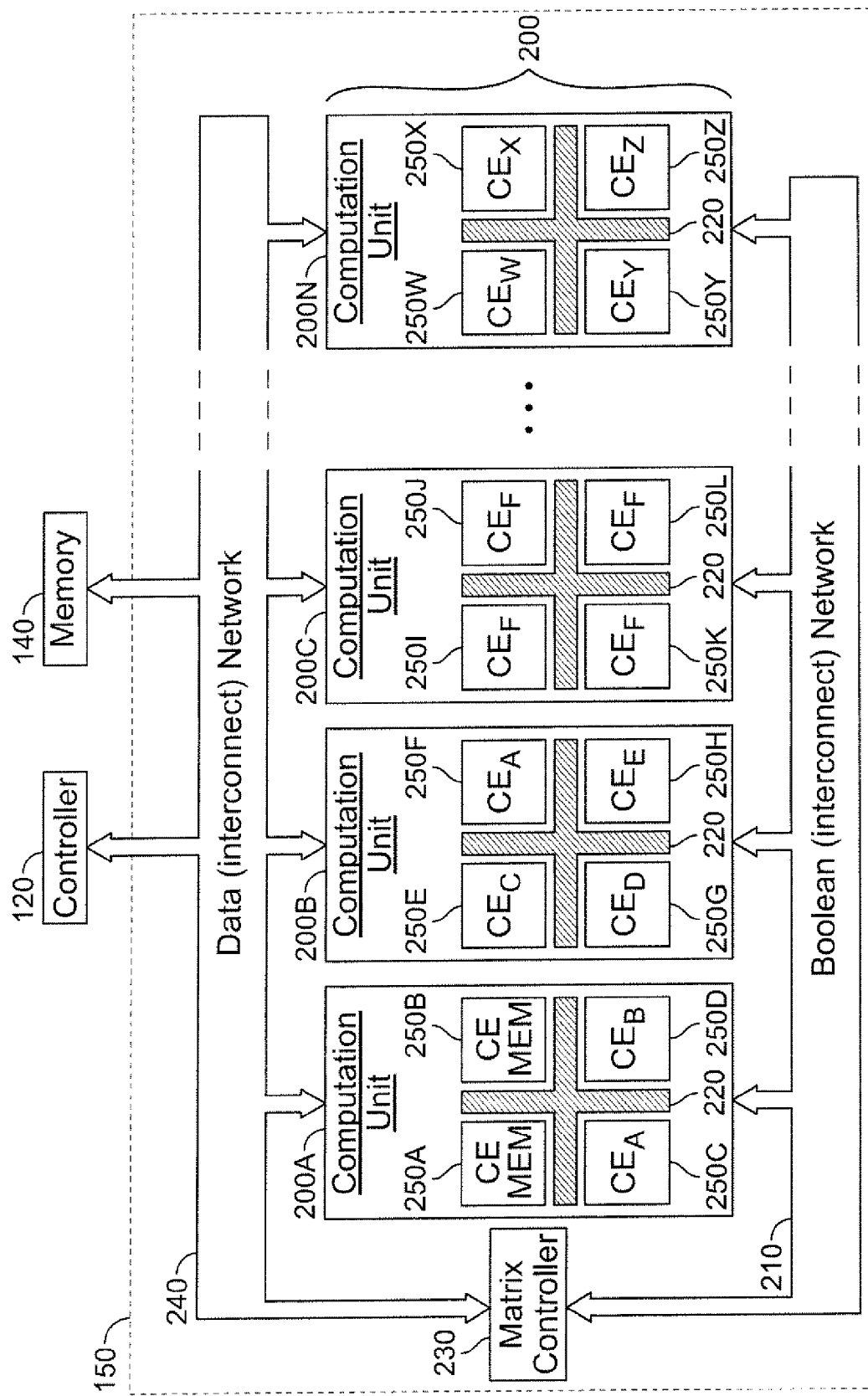
FIG. 3 is a block diagram illustrating, in greater detail, a reconfigurable matrix of the adaptive computing engine.

FIG. 3 is a block diagram illustrating, in greater detail, a reconfigurable matrix 150 with a plurality of computation units 200 (illustrated as computation units 200A through 200N), and a plurality of computational elements 250 (illustrated as computational elements 250A through 250Z), and provides additional illustration of the preferred types of computational elements 250 and a useful summary of aspects of the present invention. As illustrated in FIG. 3, any matrix 150 generally includes a matrix controller 230, a plurality of computation (or computational) units 200, and as logical or conceptual subsets or portions of the matrix interconnect network 110, a data interconnect network 240 and a Boolean interconnect network 210. The Boolean interconnect network 210 provides the reconfigurable interconnection capability between and among the various computation units 200, while the data interconnect network 240 provides the reconfigurable interconnection capability for data input and output between and among the various computation units 200. It should be noted, however, that while conceptually divided into reconfiguration and data capabilities, any given physical portion of the matrix interconnection network 110, at any given time, may be operating as either the Boolean interconnect network 210, the data interconnect network 240, the lowest level interconnect 220 (between and among the various computational elements 250), or other input, output, or connection functionality.

Continuing to refer to FIG. 3, included within a computation unit 200 are a plurality of computational elements 250, illustrated as computational elements 250A through 250Z (collectively referred to as computational elements 250), and additional interconnect 220. The interconnect 220 provides the reconfigurable interconnection capability and input/output paths between and among the various computational elements 250. Each of the various computational elements 250 consist of dedicated, application specific hardware designed to perform a given task or range of tasks, resulting in a plurality of different, fixed computational elements 250. Utilizing the interconnect 220, the fixed computational elements 250 may be reconfigurably connected together to execute an algorithm or other function, at any given time.

In a preferred embodiment, the various computational elements 250 are designed and grouped together, into the various reconfigurable computation units 200. In addition to computational elements 250 which are designed to execute a particular algorithm or function, such as multiplication, other types of computational elements 250 are also utilized in the preferred embodiment. As illustrated in FIG. 3, computational elements 250A and 250B implement memory, to provide local memory elements for any given calculation or processing function (compared to the more "remote" memory 140). In addition, computational elements 250I, 250J, 250K and 250L are configured (using, for example, a plurality of flip-flops) to implement finite state machines, to provide local processing capability, especially suitable for complicated control processing.

With the various types of different computational elements 250 which may be available, depending upon the desired functionality of the ACE 106, the computation units 200 may be loosely categorized. A first category of computation units 200 includes computational elements 250 performing linear operations, such as multiplication, addition, finite impulse response filtering, and so on. A second category of computation units 200 includes computational elements 250 performing non-linear operations, such as discrete cosine transformation, trigonometric calculations, and complex multiplications. A third type of computation unit 200 implements a finite state machine, such as computation unit 200C as illustrated in FIG. 3, particularly useful for complicated control sequences, dynamic scheduling, and input/output management, while a fourth type may implement memory and memory management, such as computation unit 200A as illustrated in FIG. 3. Lastly, a fifth type of computation unit 200 may be included to perform bit-level manipulation, such as for encryption, decryption, channel coding, Viterbi decoding, and packet and protocol processing (such as Internet Protocol processing).

The ability to configure the elements of the ACE relies on a tight coupling (or interdigitation) of data and configuration (or other control) information, within one, effectively continuous stream of information. The continuous stream of data can be characterized as including a first portion that provides adaptive instructions and configuration data and a second portion that provides data to be processed. This coupling or comingling of data and configuration information, referred to as a "silverware" module, helps to enable real-time reconfigurability of the ACE 106, and in conjunction with the real-time reconfigurability of heterogeneous and fixed computational elements 250, to form different and heterogenous computation units 200 and matrices 150, enables the ACE 106 architecture to have multiple and different modes of operation. For example, when included within a hand-held device, given a corresponding silverware module, the ACE 106 may have various and different operating modes as a cellular or other mobile telephone, a music player, a pager, a personal digital assistant, and other new or existing functionalities. In addition, these operating modes may change based upon the physical location of the device; for example, when configured as a CDMA mobile telephone for use in the United States, the ACE 106 may be reconfigured as a GSM mobile telephone for use in Europe.

As an analogy, for the reconfiguration possible via the silverware modules, a particular configuration of computational elements, as the hardware to execute a corresponding algorithm, may be viewed or conceptualized as a hardware analog of "calling" a subroutine in software which may perform the same algorithm. As a consequence, once the configuration of the computational elements has occurred, as directed by the configuration information, the data for use in the algorithm is immediately available as part of the silverware module. The immediacy of the data, for use in the configured computational elements, provides a one or two clock cycle hardware analog to the multiple and separate software steps of determining a memory address and fetching stored data from the addressed registers.

Referring again to FIG. 2, the functions of the KARC 125 may be explained with reference to a silverware module. As indicated above, through a silverware module, the ACE 100 may be configured or reconfigured to perform a new or additional function, such as an upgrade to a new technology standard or the addition of an entirely new function, such as the addition of a music function to a mobile communication device. Such a silverware module may be stored in memory 140, or may be input from an external (wired or wireless) source through, for example, matrix interconnection network 110.

Figure 1:
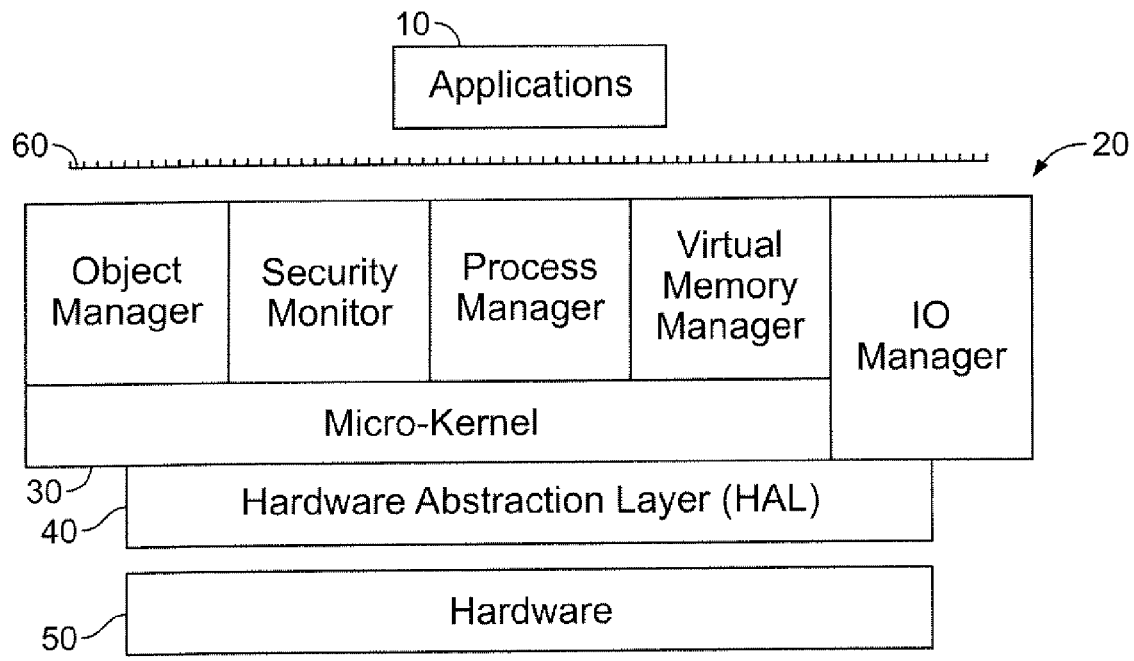
FIG. 1 illustrates a diagram of operating system layers of the prior art.
Figure 4:
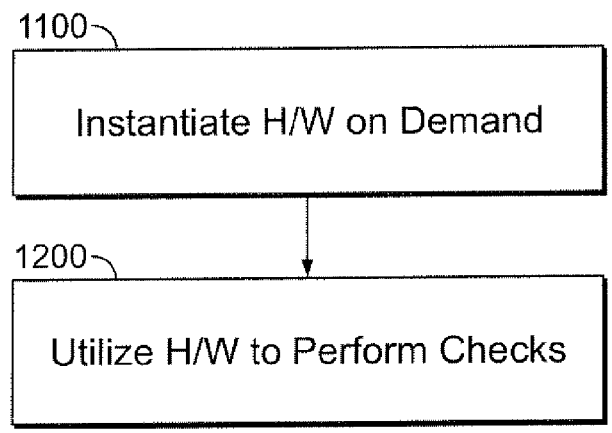
FIG. 4 illustrates an overall block flow diagram illustrates a process for achieving individualized protected space in an operating system in accordance with the present invention.

While the ability to configure and reconfigure computational elements in real-time is achieved through the ACE, the present invention applies that ability to provide a more robust operating system configuration. In accordance with the present invention, a core amount of programming, such as the kernel space, is the only so-called trusted space within the operating system. All other elements of the operating system that normally would fall within the protected space of the operating system model now receive individualized monitoring. Referring to FIG. 4, an overall block flow diagram illustrates a process for achieving individualized protected space in an operating system in accordance with the present invention. As shown in FIG. 4, the process initiates with on demand instantiation of hardware via the ACE in response to a processing call outside of the trusted space of operating system programming (step 1100). By way of example, when a device driver is input via a silverware module to perform a function on behalf of the operating system, such as a SCSI driver to perform a data transfer to memory, a hardware "machine" is formed by appropriate computational elements. Thus, in the preferred embodiment, one of the matrices 150 is configured to decrypt a module and verify its validity, for security purposes. Next, the machine then monitors the operations of the processing (step 1200). Thus prior to any configuration or reconfiguration of existing ACE 100 resources, the controller 120, through the KARC 125, checks and verifies that the configuration or reconfiguration may occur without adversely affecting any pre-existing functionality. In the SCSI driver example, the machine is configured to perform several checks to protect against invalid operations by the device driver. For example, the machine performs address checking, i.e., it ensures that the device driver interacts with a valid memory address range associated with that driver. The machine may also monitor for resource restriction violations, i.e., it ensures that limits on transfer time are not violated. Additionally, the protocol for the processing is monitored, i.e., it ensures that the hardware interacted with is left in a good state through proper communication of 'start', 'stop', and 'end' signalling. Of course, other types of monitoring may be performed as needed for particular elements, as is well appreciated by those skilled in the art.

In the preferred embodiment, the system requirements for the configuration or reconfiguration are included within the silverware module for use by the KARC 125 in performing this evaluative function. If the configuration or reconfiguration may occur without adverse affects, the silverware module is allowed to load into memory 140, with the KARC 125 setting up the DMA engines within the memory 140. If the configuration or reconfiguration would or may have such adverse affects, the KARC 125 does not allow the new module to be incorporated within the ACE 100.

Basic operations that device drivers perform can be broken down into:

Memory Reads and Writes
Reads and Writes to main memory address space to set, clear and check status of CSR (control status registers) of devices
Reads and Writes to Input/Output address space to set, clear and check status of CSR (control status registers) of devices
Hardware Interrupts
Setting up interrupt vectors to point to an interrupt service routine
Servicing interrupt
Disabling and enabling interrupts
Setting and Clearing an interrupt
Direct Memory Addressing (DMA)
Setting up a DMA transfer by Memory Reads and Writes to DMA CSRs or Memory Mapped CSRs
Setting Callback routine to be executed when DMA completes
Setting Interrupt level to be asserted when DMA completes
Setting up Memory Tables for scatter and gather operations by reads and writes
Computational Cycles
Execution of device driver code consumes clock cycles of some processor
Memory Utilization
Device driver code requires a certain amount of memory for temporary buffers, scratch pad working space, stacks, constants, data buffers, control sequences, etc. . . .
Bandwidth
Device driver code requires a certain amount of bandwidth, typically bus bandwidth, link bandwidth, bandwidth between computation units such as register files, memories, hardware units, as well as bandwidth between low level component building blocks required to construct larger structures such as multipliers, adders, shifters, etc. . . .

Depending on the nature of the device driver, the physical characteristics of the hardware under control of the device driver some to all of the above operations are utilized. Device driver code which has defects (bugs) either intentionally (as in virus) or un-intentionally can effect the system the device driver is installed since device drivers run at the protected kernel level and can thus effect the integrity of the system leading to crashes, freezes, failure to perform as specified, as well as unintentional side effects of other software and hardware in the system.

In an ACE system, with the ability to construct specialized hardware from lower level building blocks a device driver can be "protected" by uniquely special hardware to protect the system from the device driver. Thus there is no need to trust that the device driver will perform as specified, hardware will ensure that device driver performs correctly. On failure an exception is generated to the OS indicating the failure condition as well as the specific device driver that failed. The OS then has the ability to either terminated the device driver, restart the device driver, resume the device driver from a check pointed (device driver may occasionally save state and thus has a copy of a known good configuration) copy of the device driver, pass the exception upwards to be handled at a higher system level, or even notify the user and request corrective action. Specifically for each of the above basic device operators the ACE can:

Memory Reads and Writes
Reads and Writes to main memory address space to set, clear and check status of CSR (control status registers) of devices
The ACE produces a hardware memory range checking hardware to insure that the address of the memory read/writes are allowed and do not touch any memory that is out of bounds or range. This can range from sophistication from a simple address range checker (ALU) to multiple addresses for scattered CSR addresses (sophisticated multiple ALUs to perform in parallel range checking as well as insuring either read or write protection) to a full Customized MMU (memory management unit for block based address checking). Multiple address checking allows very specific and customized protection above and beyond what traditional MMU systems can provide.

Reads and Writes to Input/Output address space to set, clear and check status of CSR (control status registers) of devices
- The ACE produces a hardware memory range checking hardware to insure that the address of the Input/Output (I/O) read/writes are allowed and do not touch any memory that is out of bounds or range. This can range from sophistication from a simple address range checker (ALU) to multiple addresses for scattered CSR addresses (sophisticated multiple ALUs to perform in parallel range checking as well as insuring either read or write protection) to a full Customized MMU (memory management unit for block based address checking). Multiple address checking allows very specific and customized protection above and beyond what traditional MMU systems can provide.

Hardware Interrupts

Setting up interrupt vectors to point to an interrupt service routine
- The ACE can adapt hardware to produce hardware protection checking to insure that only a specific vector or group of specific vectors may be read or written.

Servicing interrupt
- The ACE can adapt hardware to produce hardware protection checking to insure that if the device driver does not service the interrupt that a hardware default device driver is executed.

Disabling and enabling interrupts
- The ACE can adapt hardware to produce hardware protection checking to insure that if the device driver can only enable or disable the interrupt that it has permission for.

Setting and Clearing an interrupt
- The ACE can adapt hardware to produce hardware protection checking to insure that only the specific CSR bits are read or written by the device driver. In addition, if required, a watchdog timer can be configured to insure that strict timing durations are met in terms of duration of interrupt allowed.

Direct Memory Addressing (DMA)

Setting up a DMA transfer by Memory Reads and Writes to DMA CSRs or Memory Mapped CSRs
- The ACE can adapt hardware to produce hardware protection checking to insure that only the specific CSRs or portions of CSRs as well as read/write protection is allowed by the device driver.

Setting Callback routine to be executed when DMA completes
- The ACE can adapt hardware to produce hardware protection checking to insure that no other code can change the callback routine address to insure that the specific device driver intended to be called back is.

Setting Interrupt level to be asserted when DMA completes
- The ACE can adapt hardware to produce hardware watchdog timers to insure that the DMA completes.

Setting up Memory Tables for scatter and gather operations by reads and writes
- The ACE can adapt hardware to produce hardware protection checking to insure that the specific addresses (either in memory or I/O space) are accessed thereby precluding the device driver from accessing memory that it does not have authorization for.

Computational Cycles

Execution of device driver code consumes clock cycles of some processor
- The ACE can adapt hardware to produce hardware cycle count checking to insure that the device driver does not exceed the specified maximum number of cycles. This can be used to terminate run-away tasks, or operations that are taking too long and may begin to effect system operation.

Memory Utilization

Device driver code requires a certain amount of memory for temporary buffers, scratch pad working space, stacks, constants, data buffers, control sequences, etc. . . .
- The ACE produces a hardware memory range checking hardware to insure that the address of the memory read/writes are allowed and do not touch any memory that is out of bounds or range. This can range from sophistication from a simple address range checker (ALU) to multiple addresses for scattered CSR addresses (sophisticated multiple ALUs to perform in parallel range checking as well as insuring either read or write protection) to a full Customized MMU (memory management unit for block based address checking). Multiple address checking allows very specific and customized protection above and beyond what traditional MMU systems can provide.
- This may include if required hardware resource checking on the amount of memory space used to see if it will exceed a maximum specified limit (for example if the upper limit on stack space is exceeded)

Bandwidth

Device driver code requires a certain amount of bandwidth, typically bus bandwidth, link bandwidth, bandwidth between computation units such as register files, memories, hardware units, as well as bandwidth between low level component building blocks required to construct larger structures such as multipliers, adders, shifters, etc. . . .
- The ACE produces a hardware bandwidth checker to insure that the specified amount of bandwidth used on the MIN is not exceeded. This can be as simple as a total number of bytes transferred limit, to an average rate not to exceed limit.

The advantage here is that only the hardware protection that is required for a particular execution of the device driver needs to consume resources. For example, if no DMA is used then no ACE circuitry protecting the DMA is required. Even more resource efficient is if between to different calls to the device driver which use differing levels of operators then only the exact hardware protection is required—e.g. in a single execution no I/O read/writes are used and thus no hardware protection is required, in a second execution there is I/O read/writes and thus hardware protection is instantiated (hardware is configured and reconfigured from lower building block hardware to construct the exact hardware that is required). In a conventional hardware architecture without the ability to reconfigure the hardware the overhead for all this protection circuitry must be paid—by using only what is required during a particular time window (or execution) the ACE can provide exactly what is needed.

Thus, through the present invention, all elements outside a system's own code for operating, e.g., all the stacks, abstraction layers, and device drivers, can be readily and reliably monitored. In this manner, the vulnerability present in most current operating systems due to unchecked access below the demarcation line is successfully overcome. Further, the reconfigurability of the ACE architecture allows the approach to adjust as desired with additions/changes to an operating system environment.

From the foregoing, it will be observed that numerous variations and modifications may be effected without departing from the spirit and scope of the novel concept of the invention. Further, it is to be understood that no limitation with respect to the specific methods and apparatus illustrated herein is intended or should be inferred. It is, of course, intended to cover by the appended claims all such modifications as fall within the scope of the claims.

What is claimed is:

1. A method for achieving a protected space in an operating system of an adaptive computing engine, the adaptive computing engine comprising hardware computing matrices that are configurable, each of the configurable hardware computing matrices comprising a plurality of heterogeneous computational units each including a plurality of computational elements and an interconnection network between the computational elements having interconnections that are configurable to configure the computational unit to perform a function, the plurality of heterogeneous computational units including a first type of simple computational units and a second type of complex processing computational units, the method comprising:
   receiving a demand for an element of the operating system outside of the protected space to have a function performed by the adaptive computing engine by configuring the interconnections of the interconnection networks between at least the computational elements of at least the first type of simple computational units and the second type of complex processing computational unit;
   configuring at least one of the hardware computing matrices to verify that the function can be performed without adverse effects by configuring its interconnections between its computational elements of its respective computational units;
   causing a resulting denial or allowance of access to the element of the operating system outside of the protected space for performing the function dependant on whether the at least one of the hardware computing matrices verifies that the function can be performed without adverse effects.

2. The method of claim 1 wherein the at least one of the hardware computing matrices is configured to perform memory address range checking.

3. The method of claim 1 wherein the at least one of the hardware computing matrices is configured to perform resource restriction checking.

4. The method of claim 3 wherein the resource restriction further comprises a time duration restriction.

5. The method of claim 1 wherein the at least one of the hardware computing matrices is configured to monitor protocol processing.

6. The method of claim 1 wherein the at least one of the hardware computing matrices is configured to monitor device driver operation.

7. The method of claim 1 wherein the at least one of the hardware computing matrices is configured to monitor hardware abstraction layer operation.

8. The method of claim 1 wherein the at least one of the hardware computing matrices is configured to monitor only software operations that are used from run to run.

9. The method of claim 1 wherein the protected space in the operating system is an operating system kernel.

10. The method of claim 9 wherein the element of the operating system outside of the protected space handles data transfers and the function comprises a data transfer.

11. The method of claim 1 wherein:
    the demand comprises a call for instantiation at least one other of the hardware computing matrices for performing the function;
    the method further comprises instantiating the at least one other of the hardware computing matrices to perform the function after the resulting allowance of access to the element of the operating system outside of the protected space.

12. The method of claim 11 wherein the instantiating the at least one other of the hardware computing matrices comprises configuring its interconnections between its computational elements.

13. The method of claim 1 wherein the hardware computing matrices are heterogeneous.

14. An adaptive computing engine with a protected space in its operating system, the adaptive computing engine comprising:
    the protected space of the operating system;
    an element of the operating system outside of the protected space;
    hardware computing matrices that are configurable, each of the configurable hardware computing matrices comprising a plurality of heterogeneous computational units each including a plurality of computational elements and an interconnection network between the computational elements having interconnections that are configurable to configure the computational unit to perform a function the plurality of heterogeneous computational units including a first type of simple computational units and a second type of complex processing computational units; and
    a controller that:
        in response to a demand for the element of the operating system outside of the protected space to have a function performed by the adaptive computing engine by configuring the interconnections of the interconnection networks between at least the computational elements of at least the first type of simple computational units and the second type of complex processing computational unit, and causes at least one of the hardware computing matrices to be configured to verify that the function can be performed without adverse effects, the at least one of the hardware computing matrices being configured by configuring its interconnections between its computational elements of its respective computational units; and
        causes a resulting denial or allowance of access to the element of the operating system outside of the protected space for performing the function dependant on whether the at least one of the hardware computing matrices verifies that the function can be performed without adverse effects.

15. The adaptive computing engine of claim 14 wherein the at least one of the hardware computing matrices is configured to-perform memory address range checking.

16. The adaptive computing engine of claim 14 wherein the at least one of the hardware computing matrices is configured to perform resource restriction checking.

17. The adaptive computing engine of claim 16 wherein the resource restriction further comprises a time duration restriction.

18. The adaptive computing engine of claim 14 wherein the at least one of the hardware computing matrices is configured to monitor protocol processing.

19. The adaptive computing engine of claim 14 wherein the at least one of the hardware computing matrices is configured to monitor device driver operation.

20. The adaptive computing engine of claim 14 wherein the at least one of the hardware computing matrices is configured to monitor hardware abstraction layer operation.

21. The adaptive computing engine of claim 14 wherein the at least one of the hardware computing matrices is configured to monitor only software operations that are used from run to run.

22. The adaptive computing engine of claim 14 wherein the protected space in the operating system is an operating system kernel.

23. The adaptive computing engine of claim 22 wherein the element of the operating system outside of the protected space handles data transfers and the function comprises a data transfer.

24. The adaptive computing engine of claim 14 wherein:

the demand comprises a call for instantiation at least one other of the hardware computing matrices for performing the function;

the controller further causes instantiating the at least one other of the hardware computing matrices to perform the function after the resulting allowance of access to the element of the operating system outside of the protected space.

25. The adaptive computing engine of claim 24 wherein the at least one other of the hardware computing matrices is instantiated by configuring its interconnections between its computational elements.

26. The adaptive computing engine of claim 14 wherein the hardware computing matrices are heterogeneous.

* * * * *

UNITED STATES PATENT AND TRADEMARK OFFICE
CERTIFICATE OF CORRECTION

PATENT NO. : 7,660,984 B1  Page 1 of 1
APPLICATION NO. : 10/437855
DATED : February 9, 2010
INVENTOR(S) : Paul L. Master It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1084 days.

Signed and Sealed this

Thirtieth Day of November, 2010

David J. Kappos
*Director of the United States Patent and Trademark Office*